US006727846B1

(12) United States Patent
Brown (10) Patent No.: US 6,727,846 B1
(45) Date of Patent: Apr. 27, 2004

(54) APPARATUS AND METHOD FOR MINIMIZING MULTIPATH SIGNAL ERRORS DURING TRACKING OF GPS SATELLITE SIGNALS

(75) Inventor: Alison K. Brown, Colorado Springs, CO (US)

(73) Assignee: Navsys Corporation, Colorado Springs, CO (US)

( * ) Notice: Subject to any disclaimer, the term of this patent is extended or adjusted under 35 U.S.C. 154(b) by 0 days.

(21) Appl. No.: 09/666,111

(22) Filed: Sep. 20, 2000

(51) Int. Cl.[7] .............................. G01S 5/02; H04B 7/185
(52) U.S. Cl. .................................. 342/357.06; 701/215
(58) Field of Search ........................... 342/372, 357.06; 701/215

(56) References Cited

U.S. PATENT DOCUMENTS

| 4,608,569 | A |   | 8/1986 | Dickey, Jr. et al. .......... 343/384 |
| 4,894,662 | A | * | 1/1990 | Counselman ............... 342/450 |
| 5,347,536 | A |   | 9/1994 | Meehan .......................... 375/1 |
| 5,414,729 | A |   | 5/1995 | Fenton ......................... 375/209 |
| 5,444,451 | A |   | 8/1995 | Johnson et al. .............. 342/453 |
| 5,495,499 | A |   | 2/1996 | Fenton et al. ................ 375/205 |
| 5,751,249 | A | * | 5/1998 | Baltus et al. ................. 342/372 |
| 5,955,987 | A | * | 9/1999 | Murphy et al. ......... 342/357.06 |
| 6,047,017 | A |   | 4/2000 | Cahn et al. .................... 375/200 |
| 6,101,399 | A |   | 8/2000 | Raleigh et al. .............. 455/561 |
| 6,421,000 | B1 | * | 7/2002 | McDowell .............. 342/357.06 |
| 6,430,216 | B1 | * | 8/2002 | Kober et al. ................. 375/148 |

* cited by examiner

Primary Examiner—Theodore M. Blum
(74) Attorney, Agent, or Firm—William E. Hein (57) ABSTRACT

A digital GPS receiver includes electronics to detect the presence of multipath GPS signals, determine the direction from which they are received at a multi-element GPS phased array antenna, adaptively generate an antenna pattern to provide gain in the direction of the desired GPS satellite signal, and to apply nulls in the direction of the detected GPS multipath signals. This adaptively-generated antenna pattern is applied to the signals received at the elements of the GPS phased array antenna to provide a composite signal to each of the processing channels of the digital GPS receiver, optimized for the particular GPS satellite being tracked by a corresponding channel. The undesirable multipath GPS signals are thereby excised from the inputs to the processing channels of the digital GPS receiver, and the desired direct signal is reinforced, thus enabling tracking loops within the digital GPS receiver to make highly accurate observations of the code and carrier phase using conventional signal processing techniques.

20 Claims, 8 Drawing Sheets

APPARATUS AND METHOD FOR MINIMIZING MULTIPATH SIGNAL ERRORS DURING TRACKING OF GPS SATELLITE SIGNALS

FIELD OF THE INVENTION

The present invention relates generally to the formation of antenna patterns through spatial processing and more particularly to a method for minimizing code and carrier multipath signal errors when tracking the GPS signals.

BACKGROUND AND SUMMARY OF THE INVENTION

Phased array antennas are used in a variety of aerospace applications. A phased array antenna has a number of antenna elements that are aligned in phase to provide transmit or receive gain. By adjusting the amplitude and phase of the input signals from the different antenna elements using complex weights, interference sources can be isolated and rejected from the composite signal, and the desired signal can be reinforced. Phased array antennas have been used to eliminate interference sources for GPS (Global Positioning Satellite) receivers or to increase the received signal power through beam steering to the GPS satellites. It is the purpose of the present invention to use the phased array to minimize the effect of multipath signal sources in a GPS receiver's tracking loops.

Multipath errors are caused by the receiver tracking a composite of the direct GPS signals and GPS signals reflected from nearby objects. The resulting phase error is a function of the phase offset between the direct and multipath signals and the relative signal strength. For a fixed installation, these errors appear as biases, changing only as the line-of-sight to the satellite changes due to the satellite motion. In a mobile application, the multipath errors will also change due to the motion of the antenna.

Figure 1:
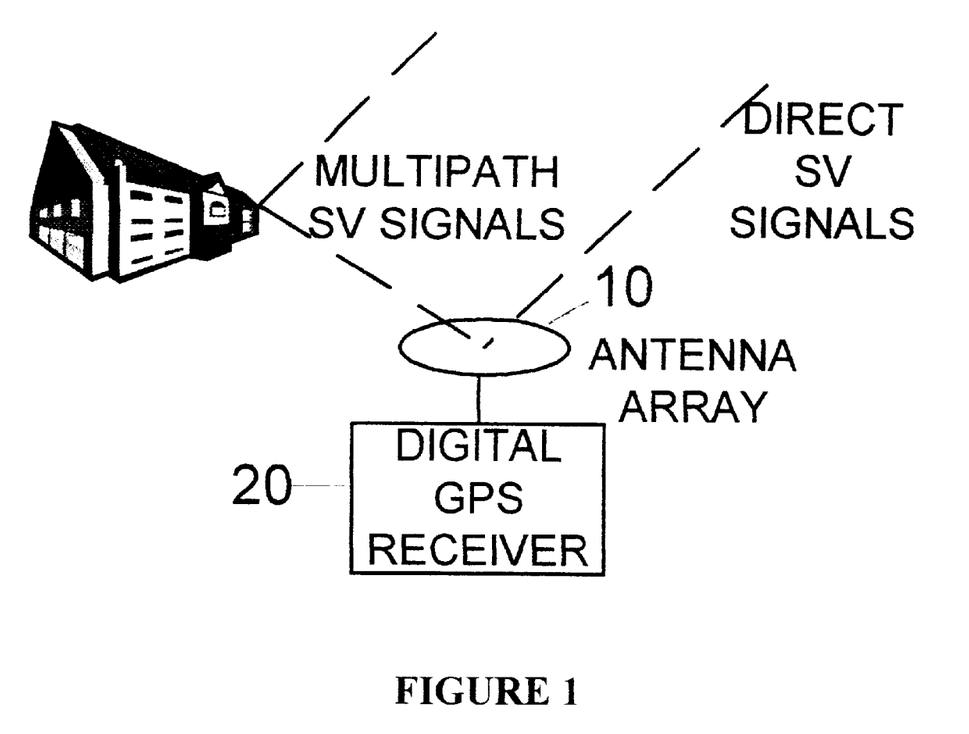
FIG. 1 is an overall block diagram illustrating a GPS antenna array and a digital receiver in accordance with the present invention.

GPS receivers commonly use broad antenna gain patterns so that all of the satellites above the horizon can be tracked. Unfortunately, this increases the susceptibility of GPS receivers to multipath reflections of the GPS signals from nearby objects. Multipath signals from below the receiver antenna can be removed using some types of antenna design, such as a choke ring, but signals arriving form elevations above the antenna cannot be rejected without also eliminating the satellite signals that are needed to obtain high accuracy GPS solutions. A simple depiction of multipath signals received at a GPS antenna is shown in FIG. 1.

Since the GPS receiver observes a composite signal, including both the direct path and the indirect (multipath) path, the code and carrier tracking loops track the composite signal, resulting in pseudo-range (code) errors and carrier-phase errors which are proportional to the additive multipath path length and the relative received power of the multipath signals to the direct signal from the satellite.

Numerous signal processing techniques have been proposed in the prior art for reducing the effect of multipath errors on the tracking loops. Exemplary of this prior art are U.S. Pat. No. 5,347,536 to Meehan and U.S. Pat. No. 5,414,729 to Fenton. These references are directed to methods employing temporal filtering of the multipath errors, multipath correction from site calibration or correlation shape correction, and multiple digital correlators. These techniques can be used to reduce the effect of multipath on the GPS code and carrier tracking loops but do not remove the source of the error. It would be advantageous to remove the multipath error source before the GPS tracking loops are employed.

Briefly, the present invention is directed to a GPS phased array and a digital GPS receiver which includes electronics to detect the presence of multipath signals, determine the direction from which they arrive, and adaptively generate an antenna pattern to provide gain in the direction of the desired satellite signal and to apply null signals in the direction of the detected multipath signals. This adaptively-generated antenna pattern is applied to the signals from the multiple antenna array elements to provide a composite signal to each of the GPS receiver processing channels optimized for the particular satellite being tracked by that channel.

The advantage of this technique is that the multipath signals are excised from the inputs to the GPS receiver processing channels, and the direct signal is reinforced, thereby enabling the GPS receiver tracking loops to make highly accurate observations of the code and carrier phase using conventional signal processing techniques.

DETAILED DESCRIPTION OF THE PREFERRED EMBODIMENT

The present invention is directed to a phased array antenna and associated electronics that serve to adaptively adjust the antenna pattern to eliminate multipath signals that are received from nearby reflections of desired GPS signals. This approach is an extension of previously developed techniques for use in GPS anti-jamming applications, in which nulls are placed in the direction of jammers using a Controlled Reception Pattern Array (CRPA). The present invention uses a GPS phased array antenna and adaptive antenna electronics to detect GPS multipath signal sources and then place nulls in the direction of those multipath signal sources through computation of the appropriate complex weights to create the array adaptive pattern.

Referring now to FIG. 1, there is shown a GPS antenna array 10 and a GPS receiver 20 which performs array spatial processing, as well as the conventional GPS receiver functions that involve tracking the GPS satellites and computing a navigation solution.

Figure 2:
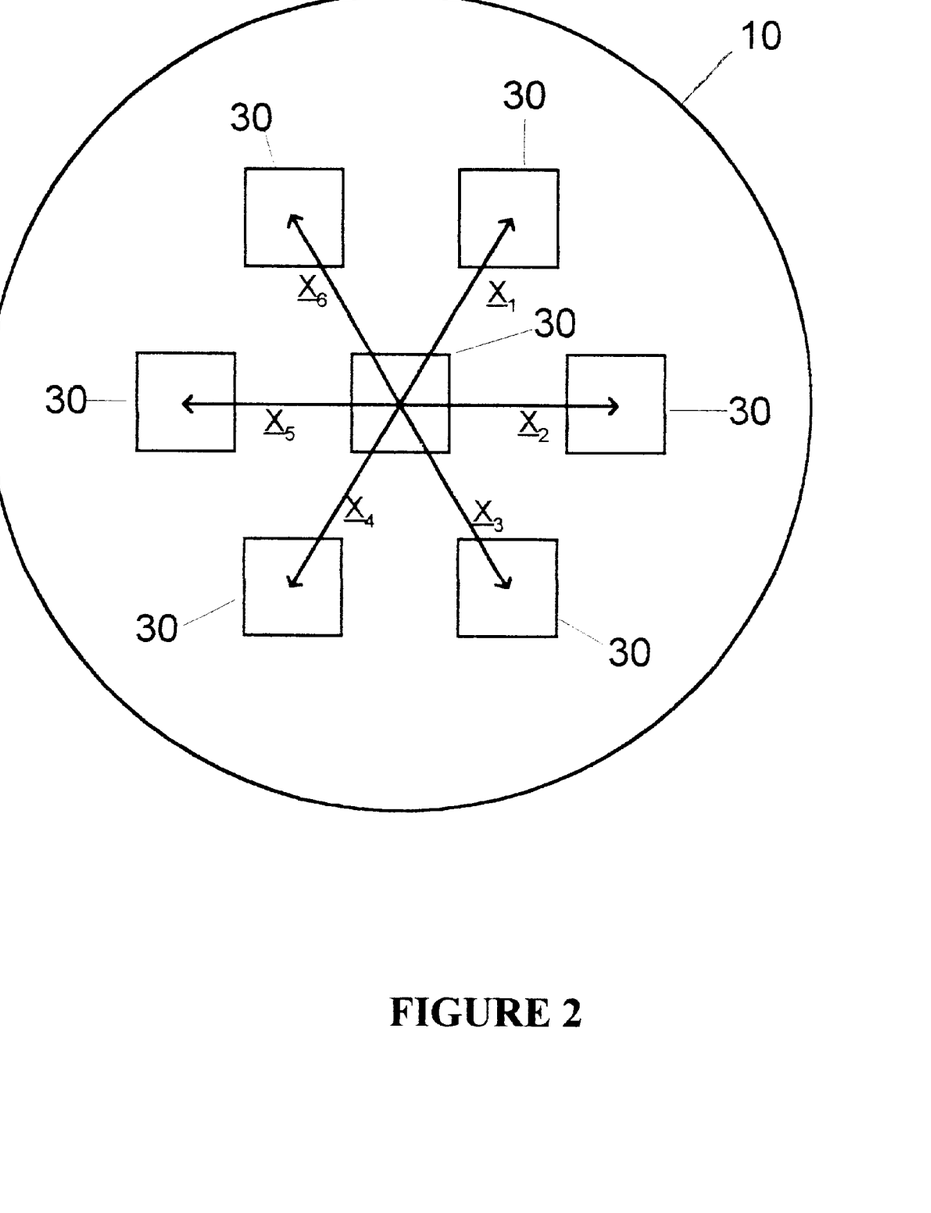
FIG. 2 is an illustration of a 7-element phased array antenna that can be used to provide the multiple GPS signal inputs to the digital GPS receiver of FIG. 1.

Referring now to FIG. 2, there is shown one embodiment of a GPS antenna array which comprises seven elements 30 positioned in a hexagonal pattern, each separated by one-half the free space wavelength, which is 0.1904 meters (7.5 inches) at the GPS L1 frequency of 1.57542 GHz. The described embodiment is for an L1 only receiver implementation. An alternative embodiment could also accommodate operation at other GPS frequencies, such as the L2 frequency (1227.6 MHz), by using a dual-frequency antenna array and increasing the number of processing channels. While the present invention is described as employing seven antenna elements, any number of antenna elements (N) may be used. While microstrip patch antenna elements are shown in FIG. 2, other types of antenna elements, such as printed dipole or printed spiral antenna elements, may be employed instead.

Figure 3:
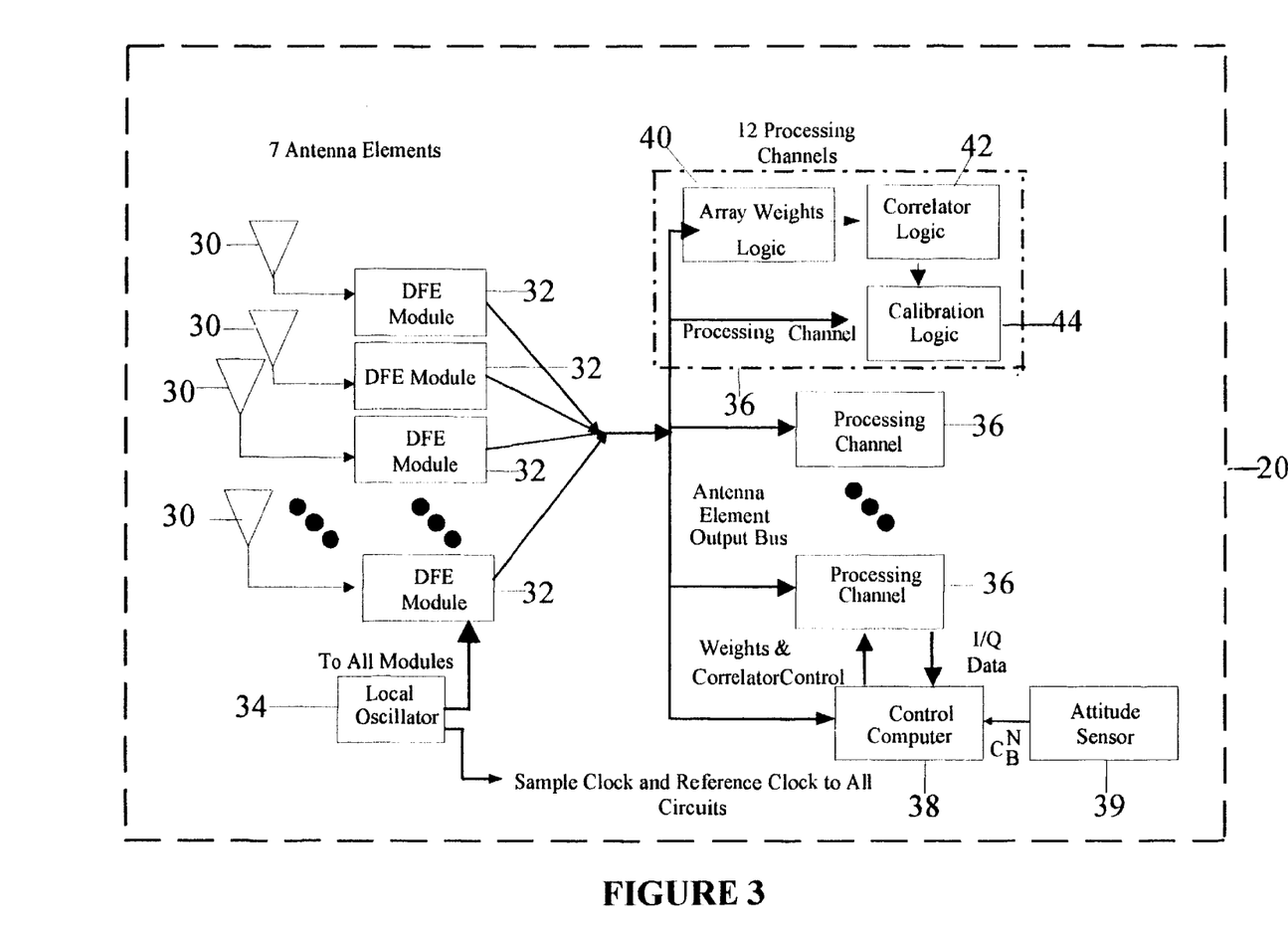
FIG. 3 is a block diagram of the digital GPS receiver of FIG. 1, implementing digital beamsteering and multipath nulling in accordance with the preferred embodiment of the present invention.

Referring now to FIG. 3, there is shown one embodiment of the digital GPS receiver 20 of FIG. 1, implementing digital beamsteering and multipath nulling prior to tracking the GPS satellite signals. The GPS signals from multiple individual antenna elements 30 each connect to a digital front-end (DFE) electronics module 32, which module is used to convert the RF signals to a digitally-sampled representation of each antenna input. All of the DFE electronics modules 32 are operated from a common local oscillator unit (LO) 34 which generates a LO frequency reference and sample clocks. The outputs from all of the DFE electronics modules 32 are passed to a plurality of processing channels 36. Each of the processing channels 36 performs digital signal processing functions on the vector of the digital signals at the outputs of the DFE electronics modules 32, optimized for the particular GPS satellite that is designated to that processing channel 36. The digital signal processing functions that are performed by the processing channels 36 include applying the array weights, by way of an array weights logic module 40, to the DFE signals, performing the GPS satellite code and carrier correlation functions, by way of correlator logic block 42, used to track the GPS satellites, and implementing a calibration function, by way of a calibration logic module 44, to provide the signals used to estimate the presence of multipath signals. A control computer 38 is employed to provide software control of the processing channels 36 and to compute the adaptive weights used to perform the satellite beamsteering and multipath nulling functions.

Figure 4:
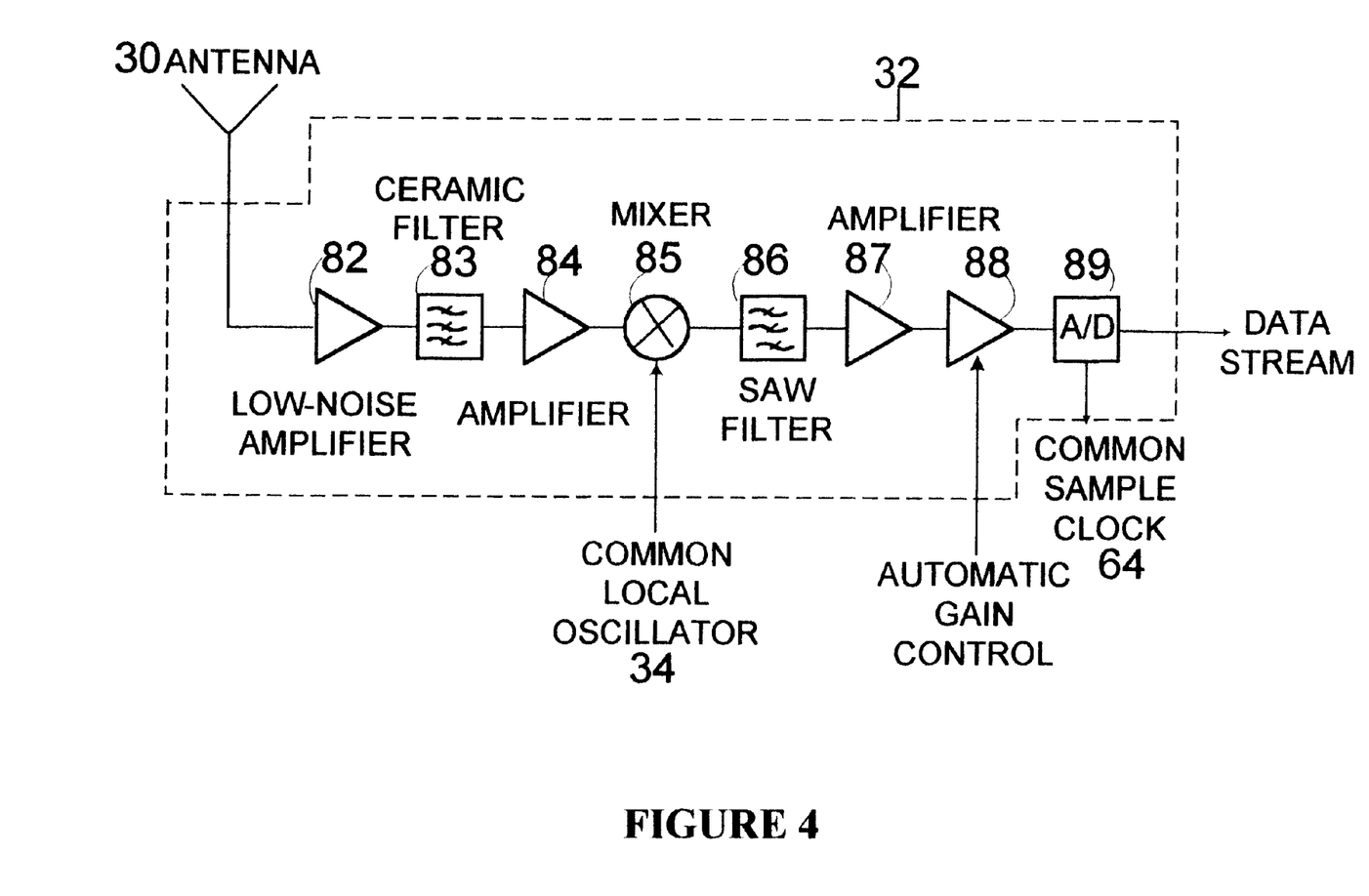
FIG. 4 is a detailed block diagram of a representative one of the digital front-end (DFE) modules of the digital GPS receiver of FIGS. 1 and 3.

Referring now additionally to FIG. 4, there is shown a block diagram of a representative one of the DFE electronics modules 32 of FIG. 3. The plurality of DFE electronics modules 32 converts the analog signals at the output of each of the antenna elements 30 to a digital sampled signal ($s_i(t)$). Each of the DFE electronics modules 32 operates from a common reference local oscillator (REF LO) 34 that also provides a common sample clock which is synchronized to local oscillator 34. The functions of the DFE electronics modules 32 are to down-convert the GPS signals from radio frequency (RF) to intermediate frequency (IF) and to sample and convert the analog IF signal into a digital data stream. The GPS signals received at the antenna elements 30 are passed through a low-noise amplifier 82, a ceramic filter 83, and another amplifier 84 to mix at a mixer 85 with coherent signals generated by a common local oscillator 34. The mixed and down-converted signals are then passed through a SAW filter 86 to form the IF frequency signals. The IF signals are then passed through an amplifier 87, and an automatic gain control stage 88 which is operated under control of the control computer 38 to set the correct levels for an analog-to-digital (A/D) converter 89. The output of the A/D converter 89 is a sampled digital data stream that represents the digitized GPS data signals $s_k(t)$ from the output of each antenna element 30. The outputs from the plurality of DFE electronics modules 32 form a vector of the N output signals (s(t)) where N is the number of antenna elements 30. This vector of signals is passed to each of the processing channels 36 where the digital signal processing is applied.

Figure 5:
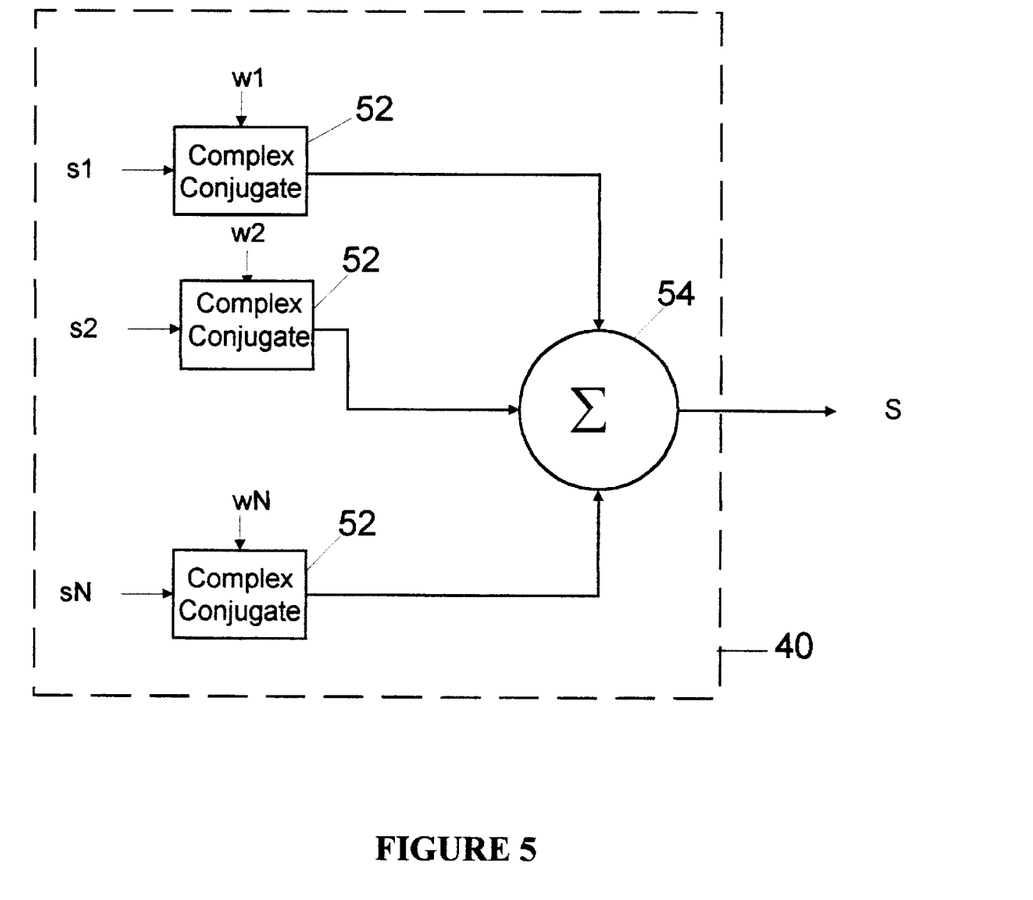
FIG. 5 is a detailed block diagram of the array weights logic module of FIG. 3 employed in the digital GPS receiver of FIG. 1.

The digital signal output from each element 30 in the antenna array 10 of FIG. 1 can be described by the following equation.

$$s_k(t) = \sum_{i=1}^{N_S} s_i(x_k, t) + n_k(t) + \sum_{j=1}^{N_M} s_{Mj}(x_k, t)$$

where $s_i(x_k,t)$ is the ith GPS satellite signal received at the kth antenna element located at $x_k$ $n_k(t)$ is the noise introduced by the kth DFE $s_{Mj}(x_k,t)$ is the jth multipath signal received at the kth antenna element $N_S$ is the number of GPS signals present $N_M$ is the number of multipath signals present The GPS satellite signal at each antenna element 30 can be calculated from the following equation.

$$s_i(x_k, t) = s_i(o, t)\exp\left(-\frac{2\pi}{\lambda}1_i^T x_k\right) = s_i(t)e_{sik}$$

where $s_i(o,t)$ is the satellite signal at the array center and $1_i$ is the line-of-sight to that satellite $e_{sik}$ are the elements of a vector of phase angle offsets for satellite i to each element k Referring now to FIG. 5, there is shown the functional details of an array weights logic module 40 of FIG. 3 employing digital signal processing (DSP) logic blocks to apply complex weights to the input digital signals through a complex conjugate operation 52 and to form a digital summation 54 to provide the composite complex digital output signals S(t) to a correlator logic block 42 in each of the processing channels 36. The digital signal processing logic of FIG. 5, contained within each of the array weights logic modules 40 of FIG. 3, allows a vector of individual weights ($w_i$) to be applied to the vector of output signals (s(t)) from each of the DFE electronics modules 32 to generate the composite complex signal ($S_i$) which is passed to the correlator logic block 42. The weights $w_i$ are downloaded from the control computer 38 and are computed independently for each of the processing channels 36 to optimize the performance for the GPS satellite selected for that particular processing channel ($SV_i$). The digital array output signal for the satellite tracked by that processing channel, $S_i(t)$, can be expressed as the following equation.

$$S_i(t) = \underline{w}_i^T s(t) = \underline{w}_i^T \left[\sum_{i=t}^{N_S} s_i(t)e_{si} + n_k(t) + \sum_{j=1}^{N_M} s_{Mj}(x_k, t)\right]$$

The weights $w_i$ are computed in the control computer 38 using an algorithm which will minimize the power of the multipath signals relative to the direct satellite signal. The output signal $S_i(t)$ is the best approximation for the GPS satellite signal, with the multipath errors removed through spatial processing.

Figure 6:
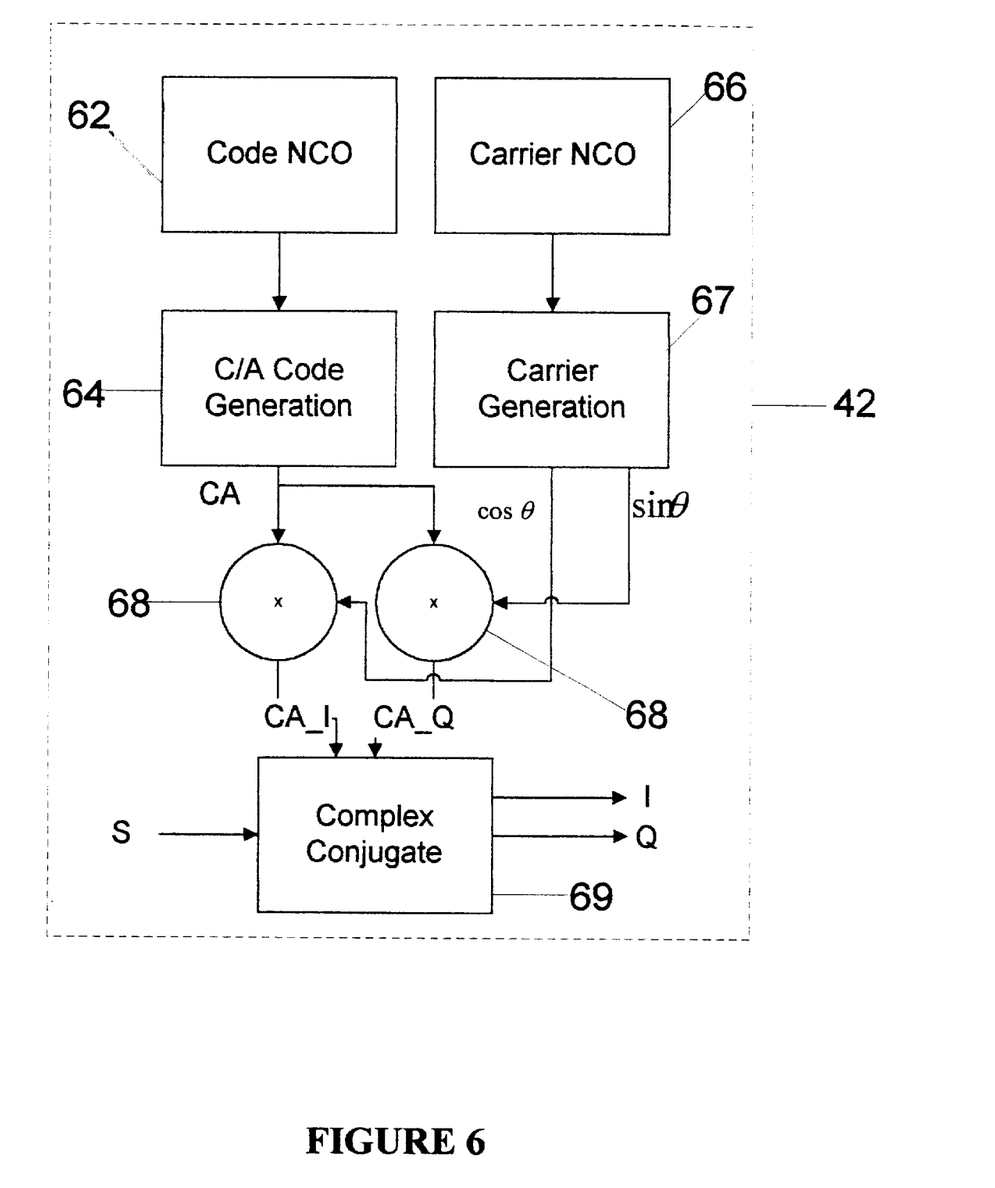
FIG. 6 is a detailed block diagram of the correlator logic block of FIG. 3 employed in the digital GPS receiver of FIG. 1.

The processing applied to this output signal $S_r(t)$ by the correlator logic block 42 is shown in FIG. 6. The correlator logic block 42 generates a best estimate of the received satellite signal under control of the control computer 38. A code NCO 62 is driven by the control computer 38 of FIG. 3 to generate the estimated code rate signal which is then used to clock a C/A code generation module 64 to generate a binary digital representation (+1/−1) of the PRN BPSK modulation broadcast by the satellite being tracked, nominally time aligned with the received signal (CA). A carrier NCO 66 is driven by control computer 38 to generate the estimated phase of the received signal, which is then used to generate a complex digital carrier nominally phase aligned with the received signal (cos θ+j sin θ). The product of the CA code signal and the digital carrier is generated through the digital modulation function 68 to generate the best estimate of the received signal in accordance with the following equation.

$$\hat{S}(t)=CA(t)(\cos\theta(t)+j\sin\theta(t))=CA(t)\,e^{j\theta(t)}=CA\_I+jCA\_Q$$

The complex conjugate of the received signal factored with the estimated signal is generated through the complex conjugate logic 69 to derive the in-phase (I) and quadrature (Q) processing channel outputs.

$$I+jQ=S(t)\hat{S}(t)^*$$

Also generated are I and Q signals from PRN code representations advanced and delayed by a fraction of a chip. The correlator logic block can also be repeated using the GPS P(Y) code PRN signals for a receiver capable of generating these codes, and for the multiple frequencies (L1 and L2) broadcast by the GPS Satellites.

These multiple I and Q signals are processed in the tracking software implemented in the control computer 38 to control the code NCO 62 and carrier NCO 66 using the conventional tracking techniques commonly employed in GPS receivers. One method of controlling the time alignment of code NCO 62 is through a delay locked loop (DLL) operating on the early and late I and Q signals. One method of controlling the phase of the carrier NCO 66 is through a phase locked loop operating on the time-aligned I and Q signals. Although conventional tracking loops are used, the advantage of the present invention is that the resulting code phase and carrier phase observations will have minimal errors introduced by multipath since these signals were excised through spatial processing on the input signal S(t) applied to the correlator logic block 42.

Figure 7:
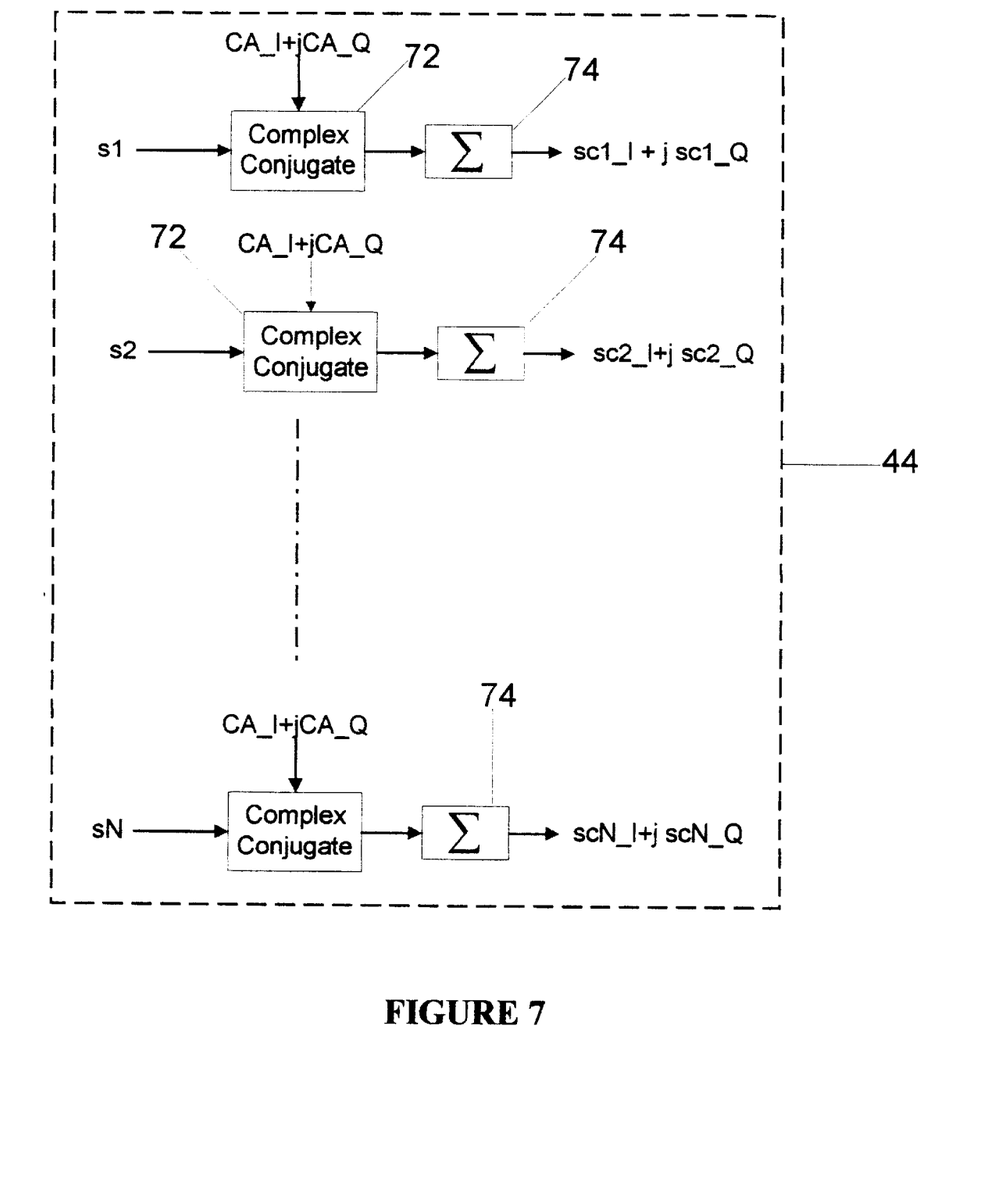
FIG. 7 is a detailed block diagram of the calibration logic block of FIG. 3 employed in the digital GPS receiver of FIG. 1.

Referring now to FIG. 7, there is shown the details of calibration logic module 44 contained within each of the processing channels 36 of FIG. 3 to provide the digital observations needed to estimate the presence of multipath signals and adapt to the weights to minimize the effect of these signals on the code and carrier tracking loop errors. The calibration logic of FIG. 7 computes the calibration complex signal for each of the output signals of the DFE electronics modules 32 by removing the best estimate of the tracked satellite signal through complex conjugate logic 72 and accumulator 74 to compute the in-phase and quadrature for each of the N antenna calibration signal outputs. The vector of complex accumulation outputs is provided to the control computer 38 for use in estimating the presence of multipath and adapting the weights to remove their effect. The calibration signal output from the kth antenna input is described by the following equation.

$$\underline{s}_c = s(t)\hat{S}(t)^* = \begin{bmatrix} sc_1\_I + jsc_1\_Q \\ \cdot \\ sc_N\_I + jsc_N\_Q \end{bmatrix}$$

Since the close-in multipath signals are delayed representations of the direct signal, the calibration signal can be expressed through the following approximation where $A_s$ is the direct signal power, $A_M$ is the multipath power post-correlation and $\theta_M$ is the phase delay in the multipath signal. Far-out multipath signals are rejected through the PRN cross-correlation process and so do not result in errors in the receiver tracking loops.

$$\underline{s}_c = \left(\sum_{i=1}^{N_S} s_i(t)\underline{e}_{si} + \underline{n}_k(t) + \sum_{j=1}^{N_M} s_{Mj}(x_k,t)\right)\hat{S}^*(t) \approx A_s\underline{e}_s + \underline{n}(t) + \sum_{j=1}^{N_M} A_{Mj}e^{j\theta_{Mj}}\underline{e}_{Mj}$$

The calibration signal outputs are processed in the control computer 38 to estimate the weights to be applied by the array weights logic block 40. Several well known algorithms can be used to compute these weights (e.g. MUSIC, ESPRIT and WSF) as described by D. A. Linebarger, "Parametric and Non-Parametric Methods of Improving Bearing Estimation in Narrowband Passive Sonar Systems," PhD. Thesis, Dept. Electrical and Computer Engineering, Rice University, Houston, Tex., 1986. In accordance with the preferred embodiment of the present invention, a parametric approach is used to estimate the multipath signal sources and then adapt the weights to apply gain in the direction of the direct satellite path and nulls in the direction of the multipath signals.

Figure 8:
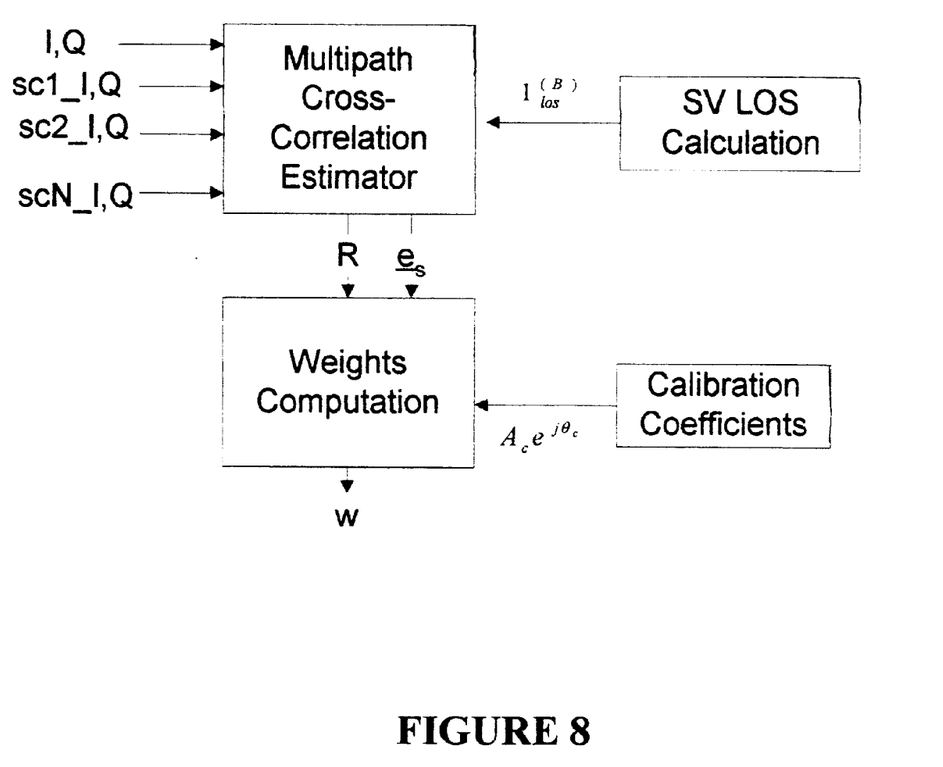
FIG. 8 is a detailed block diagram of the computational functions used to compute the weights used by the digital array weights logic module of FIGS. 3 and 5, using the outputs of the correlator logic block of FIG. 6 and the calibration logic block of FIG. 7.

FIG. 8 shows the software functions performed in the control computer 38 to compute these weights in this preferred embodiment. The cross-correlation matrix, P, is first computed from the input I and Q signals to estimate a spatiospectral correlation matrix with the estimated direct signal removed.

$$P = E\left[(\underline{s}_c - \hat{A}_s\hat{\underline{e}}_s)(\underline{s}_c - \hat{A}_s\hat{\underline{e}}_s)\right]$$

$$\hat{\underline{1}}^{(B)} = (\hat{C}_B^N)^T \frac{\hat{x}_U - x_{SV}}{|\hat{x}_U - x_{SV}|}$$

$$\hat{\underline{e}}_s = \exp\left\{-\frac{2\pi}{\lambda}\hat{\underline{1}}_i^T x_k\right\}$$

where $C_B^N$ is the direction cosine matrix that transforms from the antenna (body) coordinates to the GPS (navigation) coordinates The estimated direct signal is calculated from the I and Q outputs from the correlation logic which give the direct signal estimated magnitude ($A_s$) and from the estimated line of sight to the satellite in the antenna (body) frame. This is estimated from a knowledge of the antenna attitude which gives the body to navigation frame direction cosine matrix, a knowledge of the antenna physical layout ($x_k$), a knowledge of the antenna location from the GPS navigation solution ($x_U$), and a knowledge of the satellite location from the broadcast satellite navigation message ($x_{SV}$). The attitude can be provided by an attitude sensor 39 integrated with the digital GPS receiver 20, such as a magnetic sensor or inertial navigation system, or it can be estimated using interferometric observations of the carrier phase between the multiple antenna elements 30.

The covariance matrix provides a measure of the receiver carrier phase noise ($\sigma_n^2$) and the presence of multipath signals through the following equation.

$$P \approx I\sigma_n^2 + \left(\sum_{j=1}^{N_M} A_{Mj} e^{j\theta_{Mj}} \underline{e}_{Mj}\right)\left(\sum_{j=1}^{N_M} A_{Mj} e^{j\theta_{Mj}} \underline{e}_{Mj}\right)^T$$

Using a parametric estimation approach, the set of likely multipath signal sources are calculated as the set of values ($\zeta$) that minimize the following equation, described by D. Johnson and D. Dudgeon, "Array Signal Processing Concepts and Techniques," Prentice Hall, ISBN 0-13-048513-6, Sect 7.1.2.

$$\min_{\xi} \|P - \hat{P}(\xi)\|^2$$

$$\hat{P}(\xi) = \left(\sum_{j=1}^{N_M} \hat{A}_{Mj} e^{j\hat{\theta}_{Mj}} \hat{\underline{e}}_{Mj}\right)\left(\sum_{j=1}^{N_M} \hat{A}_{Mj} e^{j\hat{\theta}_{Mj}} \hat{\underline{e}}_{Mj}\right)^T$$

The weights required to minimize the antenna gain in the direction of the multipath signals and maximize the gain in the direction of the desired GPS satellites is then computed from the following equation, where $\hat{\sigma}_{n^2}$ is the estimated receiver carrier phase noise and $\hat{A}_{mj}$ and $\hat{e}_{mj}$ are the estimated magnitude and direction of the multipath signal sources.

$$R = I\hat{\sigma}_n^2 + \sum_{j=1}^{N_M} \hat{A}_{Mj}^2 \hat{\underline{e}}_{Mj} \hat{\underline{e}}_{Mj}^T$$

$$w_{OPT} = \frac{R^{-1}\underline{e}_s}{\underline{e}_s^T R^{-1} \underline{e}_s}$$

These weights are continually being recomputed for each of the processing channels 36 to adaptively null the multipath environment specifically for each individual channel 36. Prior to being downloaded to the array weights logic block 40 in each processing channel 36, a calibration term is added to each of the weights to correct for the any differences in the received power and any relative phase offsets between the different antenna/DFE paths. These amplitude and carrier phase terms are precomputed by a factory calibration procedure and loaded into the software within digital GPS receiver 20.

$$w_i = w_{OPTi} A_{ci} e^{j\theta_{ci}}$$

These weights are downloaded from the control computer 38 to the array weights logic block 40 where they are used to create an antenna beam towards the satellite being tracked by a particular one of the processing channels 36 and to apply nulls in the direction of the multipath signal sources detected for the satellite being tracked by that processing channel.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. Apparatus for minimizing code and carrier multipath GPS signal errors when tracking desired GPS satellite signals, the apparatus comprising:

a GPS phased array antenna for receiving direct and multipath GPS satellite signals; and a digital GPS receiver coupled to the GPS phased array antenna for tracking the desired GPS satellite signals, for detecting the presence of the multipath GPS signals received by the phased array antenna, for determining the direction from which the multipath GPS signals were received, and for adaptively generating an antenna pattern to apply nulls in the direction of the detected multipath GPS signals.

2. Apparatus as in claim 1, wherein said digital GPS receiver is operative for adaptively generating an antenna pattern that also provides gain in the direction of the desired GPS satellite signal.

3. Apparatus as in claim 1, wherein said GPS phased array antenna comprises a plurality of antenna elements arranged in a desired geometric pattern.

4. Apparatus as in claim 1, wherein said GPS phased array antenna comprises seven elements arranged in a hexagonal pattern.

5. Apparatus as in claim 1, wherein said GPS phased array antenna is operative for receiving direct GPS satellite signals at the GPS L1 frequency.

6. Apparatus as in claim 1, wherein said GPS phased array antenna is operative for receiving direct GPS satellite signals at both the GPS L1 and L2 frequencies.

7. Apparatus as in claim 1, wherein said GPS phased array antenna is operative for receiving direct GPS satellite signals at one or more selected frequencies.

8. Apparatus as in claim 3, wherein said digital GPS receiver further comprises:

a plurality of digital front end modules, each of which is connected to a selected one of the antenna elements for generating a digital representation of a signal received at that antenna element; and a plurality of processing channel modules, each of which is connected to the outputs of the plurality of digital front end modules.

9. Apparatus as in claim 8, wherein each of said processing channel modules includes an array weights logic module for generating a composite complex signal by applying a vector of individual weights to a vector of output signals provided by the plurality of digital front end modules.

10. Apparatus as in claim 9, wherein each of said processing channel modules includes a correlator logic module for tracking the direct GPS satellite signals by generating a representation of the multipath GPS satellite signals aligned in time and phase with the received direct GPS satellite signals.

11. Apparatus as in claim 10, wherein each of said processing channel modules includes a calibration logic module for removing said representation of the multipath GPS satellite signals from the output signals at each of the digital front end modules by employing a complex conjugate function and an accumulation function to generate in phase and quadrature calibration output signals for each of the antenna elements.

12. Apparatus as in claim 11, further comprising a control computer coupled to the digital GPS receiver for receiving the calibration output signals, for computing individual weights for each of the plurality of processing channel modules, and for controlling each of the correlator logic modules.

13. A process for minimizing code and carrier multipath GPS signal errors when tracking desired GPS satellite signals, the process comprising the steps of:

providing a multi-element GPS phased array antenna for receiving direct and multipath GPS satellite signals;

computing the direction of the received multipath GPS satellite signals to estimate a set of the received multipath GPS satellite signals from in phase and quadrature calibration signals, with a best estimate of the direct GPS satellite signal removed; and computing, from the estimated set of received multipath GPS satellite signals, a set of weights for minimizing gain of the GPS phased array antenna in the computed direction of the estimated set of received multipath GPS satellite signals.

14. A process as in claim 13, wherein said step of computing the direction of the received multipath GPS satellite signals employs a parametric estimation process.

15. A process as in claim 13, further comprising the step of estimating, from the in phase and quadrature calibration signals, amplitude and phase offset correlations.

16. A process as in claim 13, further comprising the step of computing, from the estimated set of received multipath GPS signals, a set of weights for maximizing gain of the GPS phased array antenna in the direction of the received direct GPS satellite signals.

17. A process as in claim 16, further comprising the steps of:

computing a covariance matrix, including a diagonal term representing an estimate of received noise at each element of the GPS phased array antenna and a summation over the estimated set of received multipath GPS satellite signals of the square of the estimated multipath GPS satellite signal amplitude multiplied by a vector of the estimated multipath GPS satellite signal phase at each element of the GPS phased array antenna multiplied by said vector transposed;

calculating a vector of weights by computing the normalized product of the inverse of said covariance matrix multiplied by the vector of the estimated direct GPS satellite signal phase at each element of the GPS phased array antenna; and compensating the vector of weights for the amplitutde and carrier phase offsets between each element of the GPS phased array antenna.

18. A process as in claim 17, further comprising the step of calculating the phase of the direct GPS satellite signal from a knowledge of the attitude and physical layout of the GPS phased array antenna, a GPS navigation solution, and the location of the GPS satellite whose direct signal is being broadcast.

19. A process as in claim 18, further comprising the step of providing an attitude sensor for determining the attitude of said GPS phased array antenna.

20. A process as in claim 18, wherein the attitude of the GPS phased array antenna is determined from interferometric observations of the carrier phase between the elements of the GPS phased array antenna.

* * * * *